US012808476B1

(12) United States Patent
Lorenzi et al.

(10) Patent No.: US 12,808,476 B1
(45) Date of Patent: Nov. 24, 2026

(54) HOSE ROLLER FOR DRAINING RESIDUAL FLUIDS FROM FLEXIBLE HOSES

(71) Applicants: Kyle Jack Lorenzi, Ukiah, CA (US); Marlyn Lyle Lorenzi, Ukiah, CA (US)

(72) Inventors: Kyle Jack Lorenzi, Ukiah, CA (US); Marlyn Lyle Lorenzi, Ukiah, CA (US)

( * ) Notice: Subject to any disclaimer, the term of this patent is extended or adjusted under 35 U.S.C. 154(b) by 81 days.

(21) Appl. No.: 19/321,180

(22) Filed: Sep. 6, 2025

(51) Int. Cl.
*F16L 55/07* (2006.01)
*B67D 7/38* (2010.01)

(52) U.S. Cl.
CPC ................ *F16L 55/07* (2013.01); *B67D 7/38* (2013.01)

(58) Field of Classification Search
CPC ........... F16L 55/07; F16L 37/18; F16L 3/012; A62C 33/00; A62C 33/02
See application file for complete search history.

(56) References Cited

U.S. PATENT DOCUMENTS

| | | | | | |
|---|---|---|---|---|---|
| 2,615,734 | A * | 10/1952 | Parry | F16C 33/7843 | 384/477 |
| 4,056,241 | A * | 11/1977 | Yates | B65H 54/585 | 242/407 |
| 4,647,075 | A * | 3/1987 | Vargo | F16L 37/18 | 285/82 |
| 5,109,882 | A * | 5/1992 | Eley | B65H 75/4478 | 137/355.27 |
| 5,388,609 | A * | 2/1995 | Ghio | A62C 33/04 | 137/355.27 |
| 5,549,262 | A * | 8/1996 | Whitehead | A01G 25/00 | 248/87 |
| 6,135,139 | A * | 10/2000 | Blake, Jr. | B65H 75/4478 | 137/355.19 |
| 6,416,009 | B1 * | 7/2002 | Iaciofano | B65H 75/4463 | 242/384.7 |
| 6,918,415 | B1 * | 7/2005 | Johnson | B67D 7/40 | 222/526 |
| 7,748,418 | B2 * | 7/2010 | Johnson | B67D 7/04 | 141/98 |
| 8,578,847 | B2 * | 11/2013 | Fox | F04B 43/1223 | 100/37 |
| 9,643,630 | B1 * | 5/2017 | Smith | B62B 1/12 | |

* cited by examiner

*Primary Examiner* — Nicole Gardner
(74) *Attorney, Agent, or Firm* — Adam Warwick Bell; Matthew Rupert Kaser

(57) ABSTRACT

A hand-held hose roller device designed to address the high rate of injury for liquid delivery truck drivers, by assisting an individual to remove residual fuel from a flexible, large diameter hose while reducing the probability of injury; specifically a hand-held hose roller device designed to assist an individual in removing residual fluid (such as gasoline or diesel fuel or any other liquid) from a flexible, large diameter hose providing the user with a simple and effective way to "walk out" the hose, reducing the effort of this task and reduces the probability of spillage of hazardous liquids.

16 Claims, 11 Drawing Sheets

FIG.9 Rear view

FIG.10 Side view

FIG. 11 Top view

HOSE ROLLER FOR DRAINING RESIDUAL FLUIDS FROM FLEXIBLE HOSES

RELATIONSHIP TO OTHER APPLICATIONS

None

GOVERNMENT SUPPORT

None

FIELD OF THE INVENTION

The present invention relates to tools for fluid transfer systems, and more specifically to a device designed to assist in the removal of residual liquid from heavy flexible hoses used in fuel and hazardous fluid delivery from a road tanker into an underground storage tank.

BACKGROUND

The inventor of this device drives a fuel delivery truck and is intimately aware of the risks and needs relevant to this sort of work. In the company the inventor works for, a few drivers are in there 80's and this device is designed to address the frequent injuries suffered by all fuel delivery drivers, the device greatly reduces the strain on the body of the driver when "walking out" the fuel delivery hose to drain it of excess fuel.

According to U.S. Department of Labor (Bureau of Labor Statistics) and OSHA data, truck drivers, particularly those who manually load, unload, or handle heavy hoses or cargo, have the highest rate of work-related musculoskeletal disorders and back injuries of any profession! One in five workplace injuries in the U.S. involves a truck driver. Hose handling, especially draining of residual liquid from the hose, and rotational stresses and awkward movements while connecting lines or securing loads, are key contributors to this very high injury rate.

According to the Environmental Protection Agency (EPA) there are currently over 542,000 underground storage tanks with hazardous petroleum products, in the United States alone. The Environmental Protection Agency has very strict standards about hazardous petroleum products being released on the ground and into the environment. For this reason hoses must be emptied of residue before disconnecting from the storage tank. Once emptied, hoses can be safely stored on the delivery vehicle. Commercial locations may receive multiple deliveries each day. Deliveries of gasoline etc. are usually carried out by a single person. This person connects a hose from the delivery vehicle to a ground connection on the storage tank. The user manually lifts the hose starting from the delivery vehicle, and then walks toward the storage tank to drain residual liquid. This is accomplished by manually walking and lifting the hose sequentially from the tanker to the storage tank. The hose is lifted hand over hand along the length of the hose from delivery vehicle to storage tank. In the industry this operation is called, "walking it out". To get residual fluid out of a hose may require "walking it out" multiple times. Some delivery locations require multiple coupled hoses to reach the storage tank. When linking multiple hoses you increase both length and weight. This operation performed manually and is both back-breaking and physically demanding. The conditions are made worse by extreme weather.

The need for a more efficient, user-friendly, and durable tool is a long-felt and well known need. The invention provides a hand-held hose roller device designed to address the very high rate of injury for liquid delivery truck drivers, by assisting an individual to remove residual fuel from a flexible, large diameter hose while reducing the probability of injury.

Figure 1:
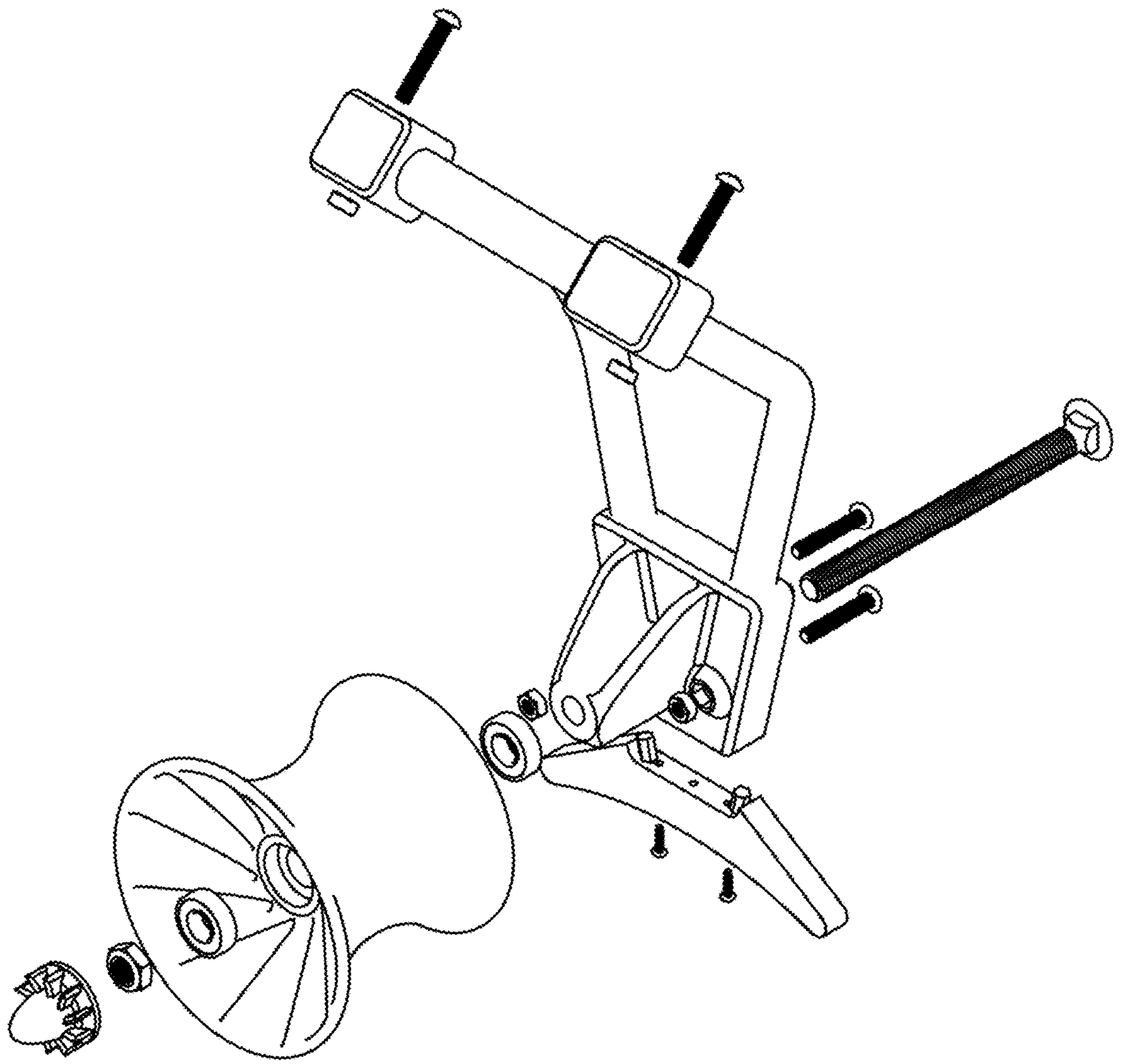
FIG. 1 is an annotated schematic diagram of the hose roller.

1. Hub (also called 'frame')
2. Bumper stand made of, e.g., thermoplastic polyurethane (TPU)
3. Bumper screws
4. Hose roller with asymmetric concave cylinder shape
5. Roller bearing
6. Roller Axle
7. Handle Bar Nut
8. Handle Bar bolt
9. Handle Bar
10. Axle Nut
11. Handle Bar Nut
12. Handle Bar knuckle
13. Knurled non-slip handle grip
14. Medial concave region (tough) of hose roller
15. Axle nut cap
16. Radial ribs to add strength (optional)
17. Roller bearing
18. First end face outwardly convex region of roller
19. Second end face outwardly convex region of roller
20. Top side of frame
21. Bottom side of frame
22. Front side of frame
23. Back side of frame
24. Bolts
25. Tubular void (bore) to receive a rotating axle.

Figure 3:

FIG. 3 is a photograph of the device of the invention in use, showing the bumper stand and showing the direction of force applied through the arm to pull the hose.

Figure 4:
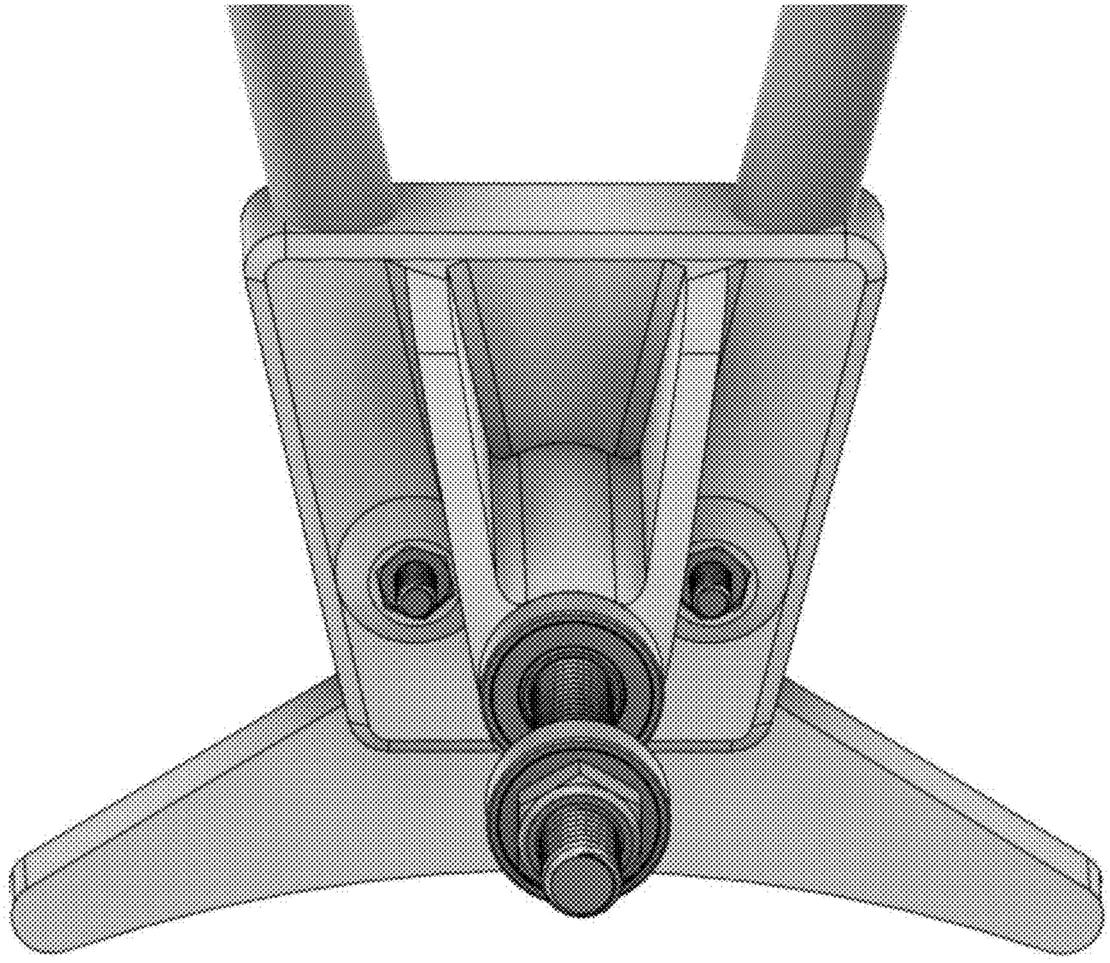

FIG. 4 is a schematic of the hub with the axle nut projecting therefrom, and the bumper stand.

Figure 5:
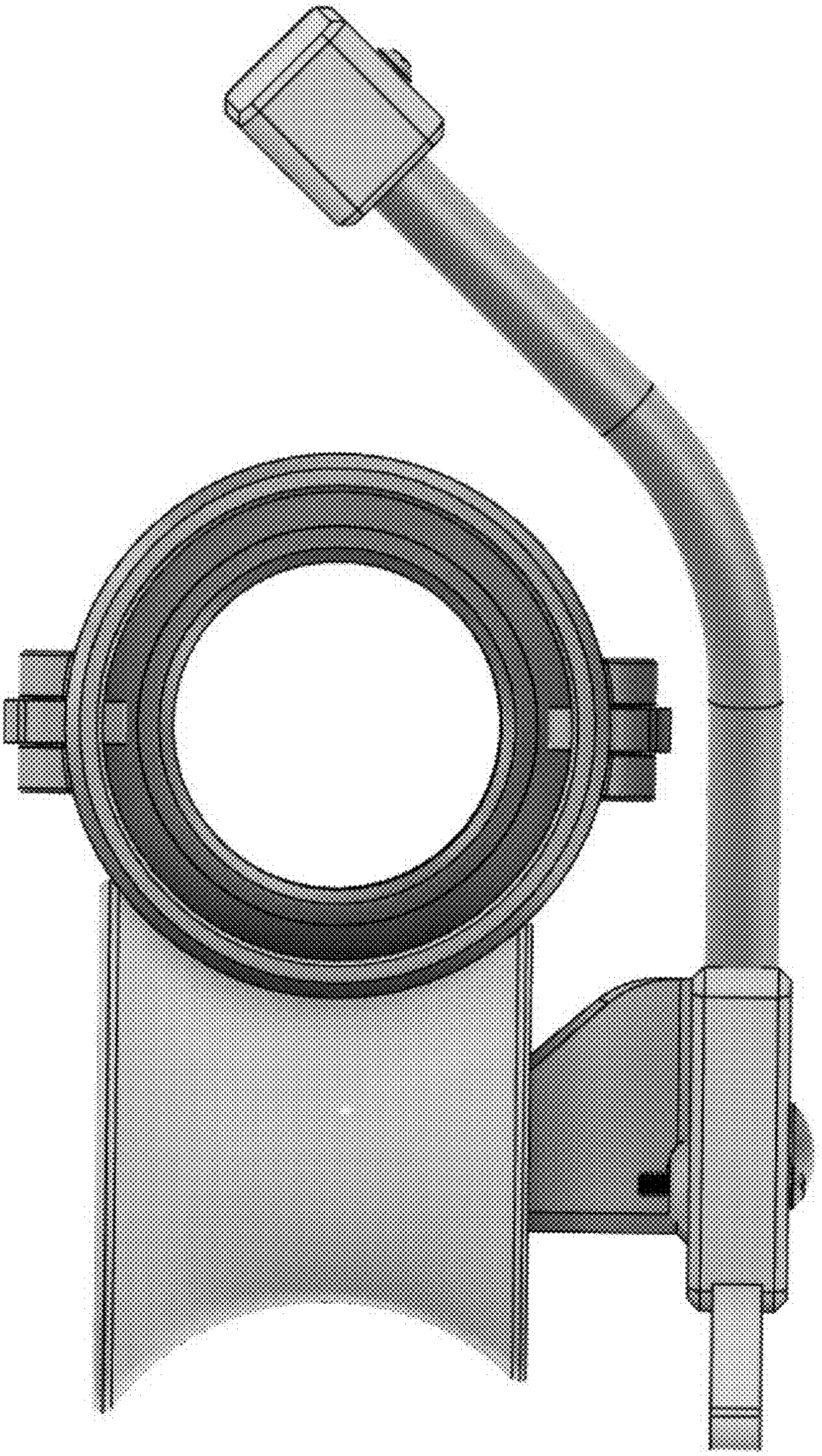

FIG. 5 shows the roller attached to the hub, the bumper stand attached to the hub, and the handlebars attached to the hub; and it also shows a hose placed on the roller, with a hose coupler positioned at the top of the roller, where there is a total of at least 50 degrees of rotational freedom between the cams and the roller, because the roller is asymmetrical, having one face with a larger diameter than the other. Specifically, the "first end face" (18), which is also called the "outer face" has a larger diameter than the "second end face" (19) which is also called the "inner face". In a typical example the "first end face" (18) had a diameter of 6" and the "second end face" (19) has a diameter of 4.5".

Figure 6:
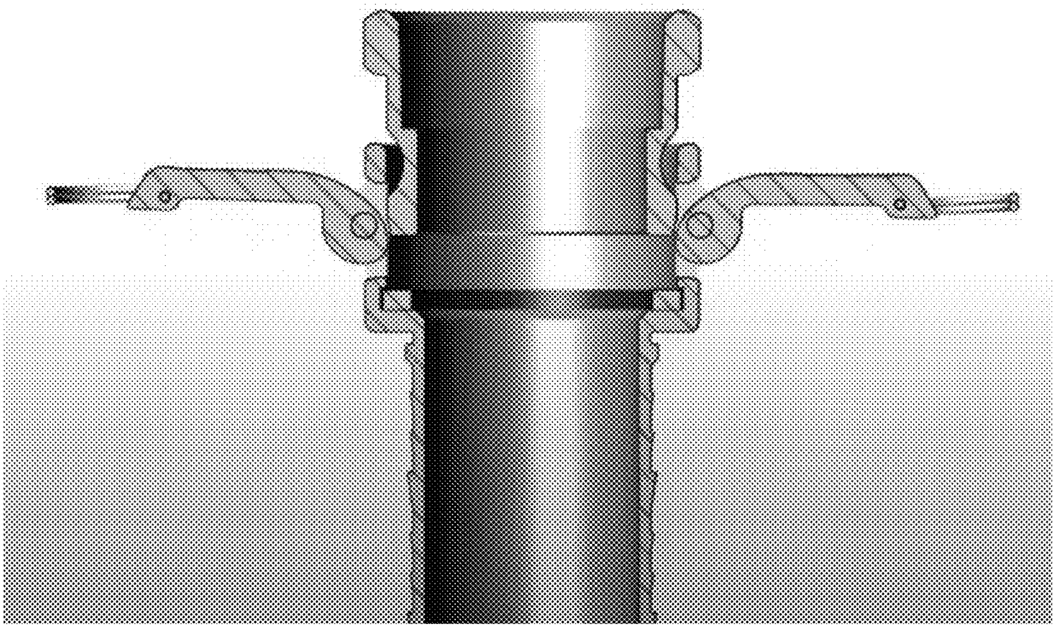

FIG. 6 is a schematic of the cam-lock coupler in an open position. Note that the coupler mechanism has cams that project out from the hose and that are positioned exactly opposite each other on the hose—i.e. 180 degrees apart.

Figure 7:
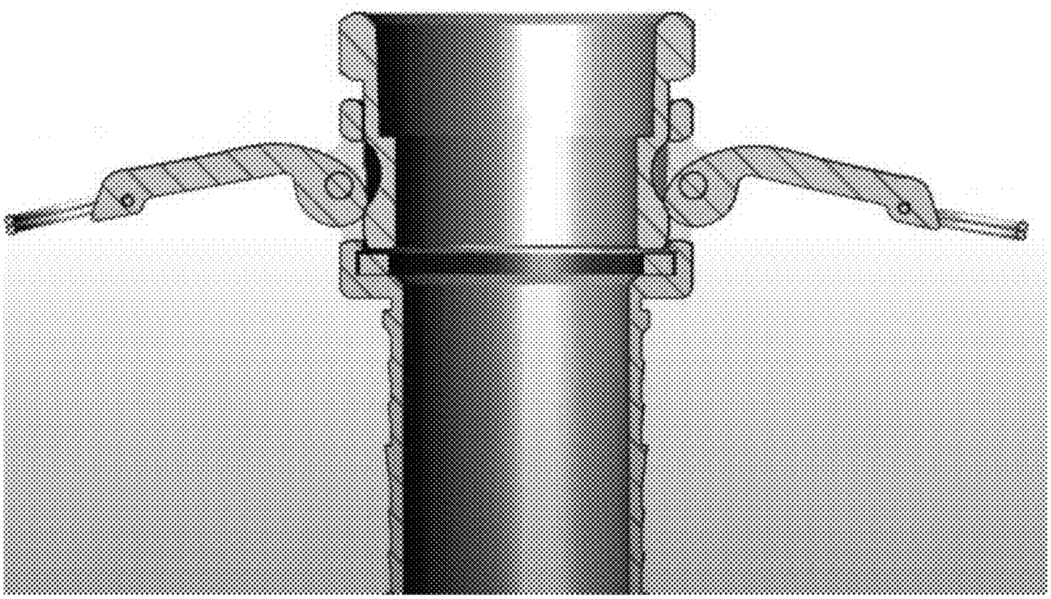

FIG. 7 is a schematic of the cam-lock coupler in a position half way between being opened and closed.

Figure 8:
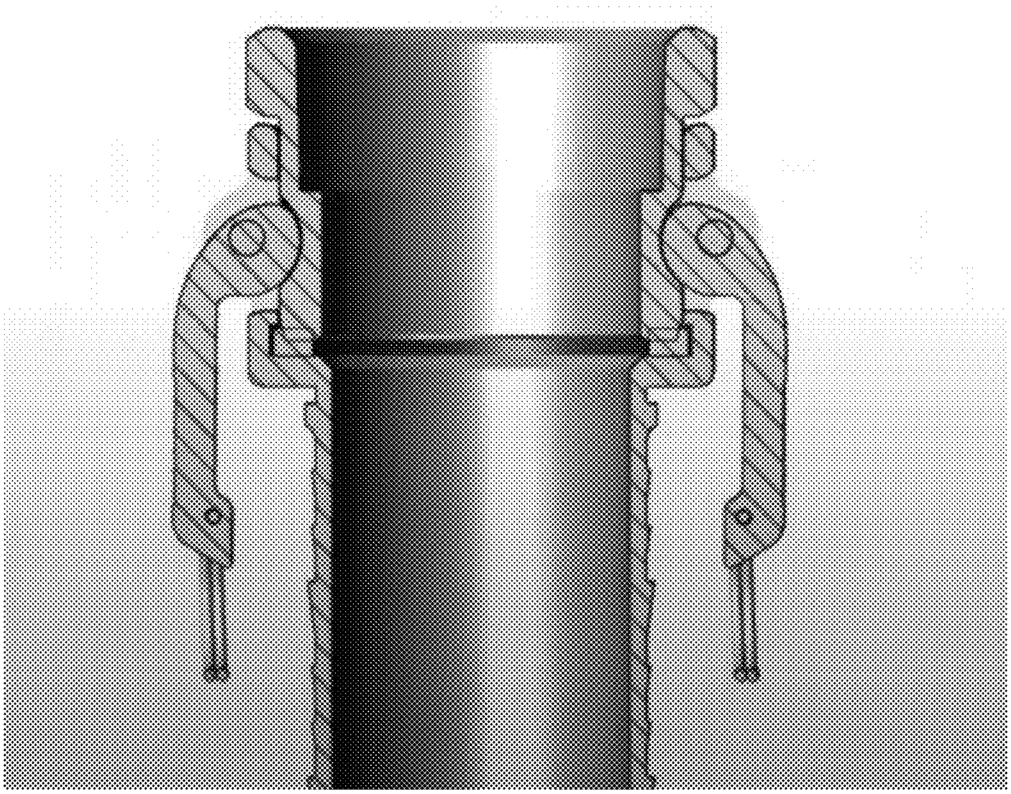

FIG. 8 is a schematic of the cam-lock coupler in a closed position.

Figure 9:
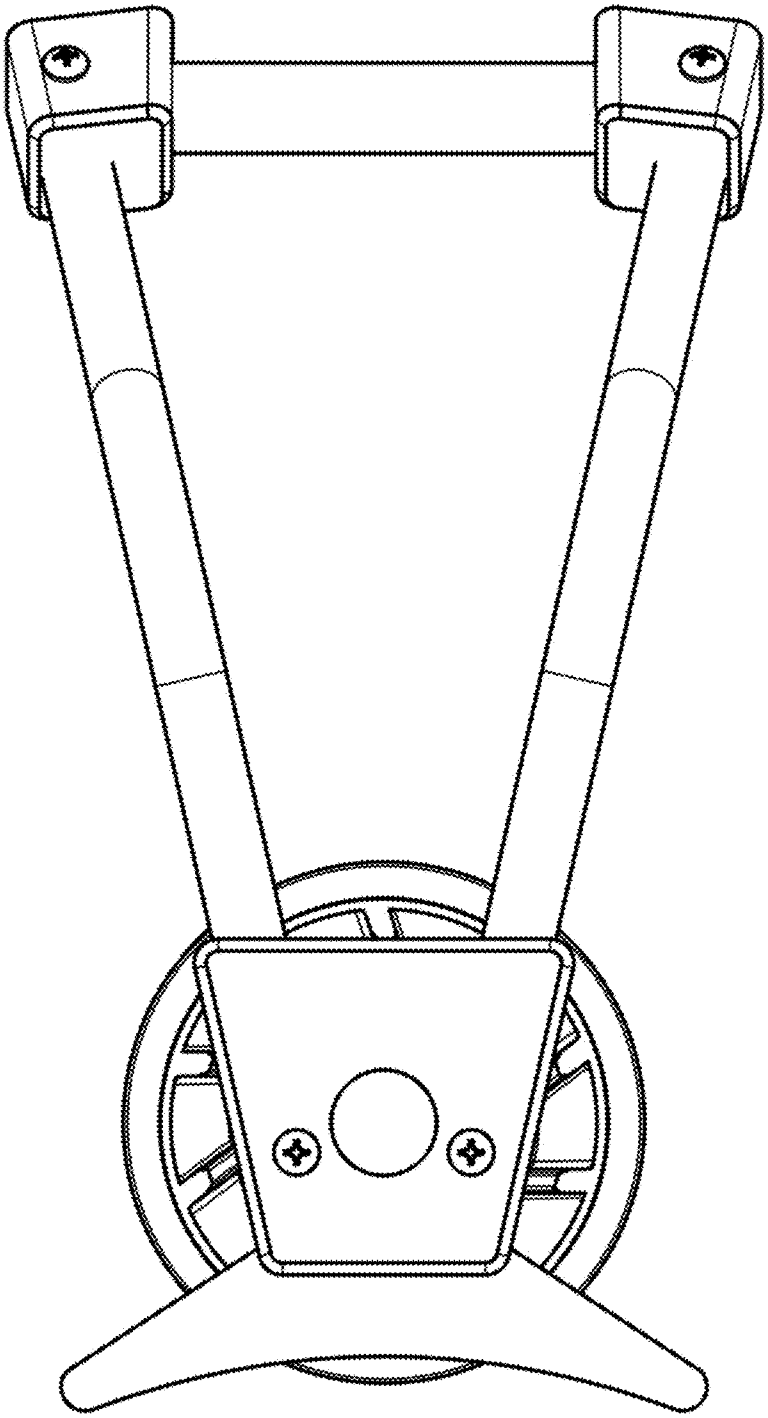

FIG. 9 is a schematic of the rear view of the invention.

Figure 10:
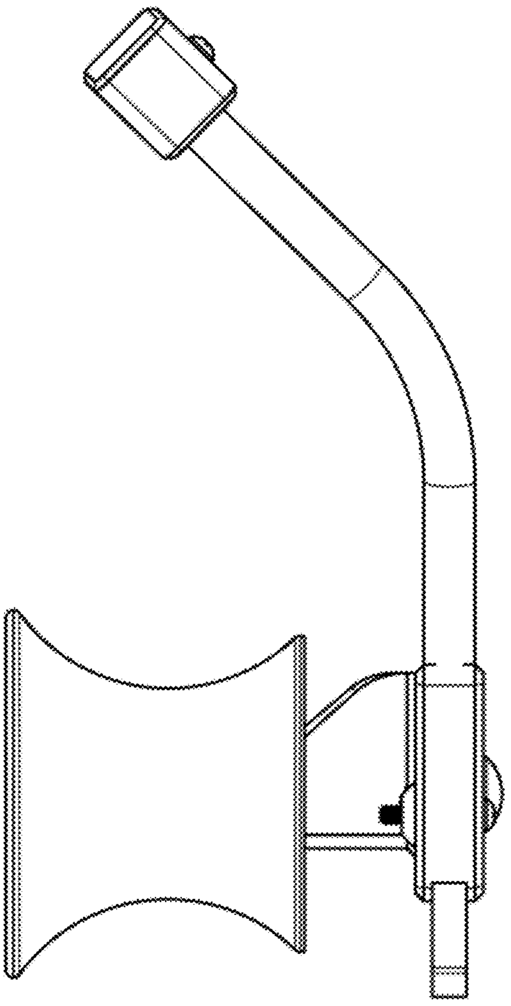

FIG. 10 is a schematic of the rear view of the invention.

Figure 11:
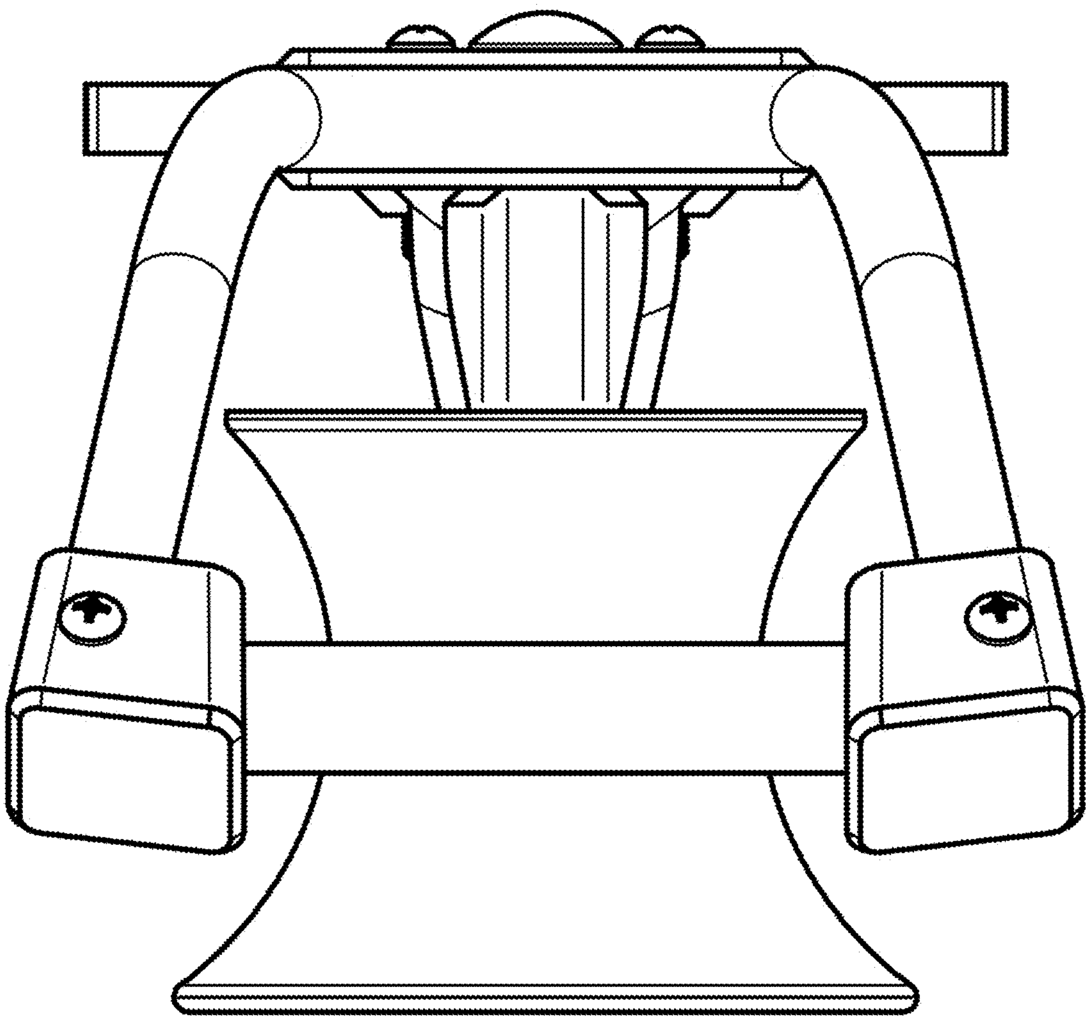

FIG. 11 is a schematic of the top view of the invention.

Figure 12:
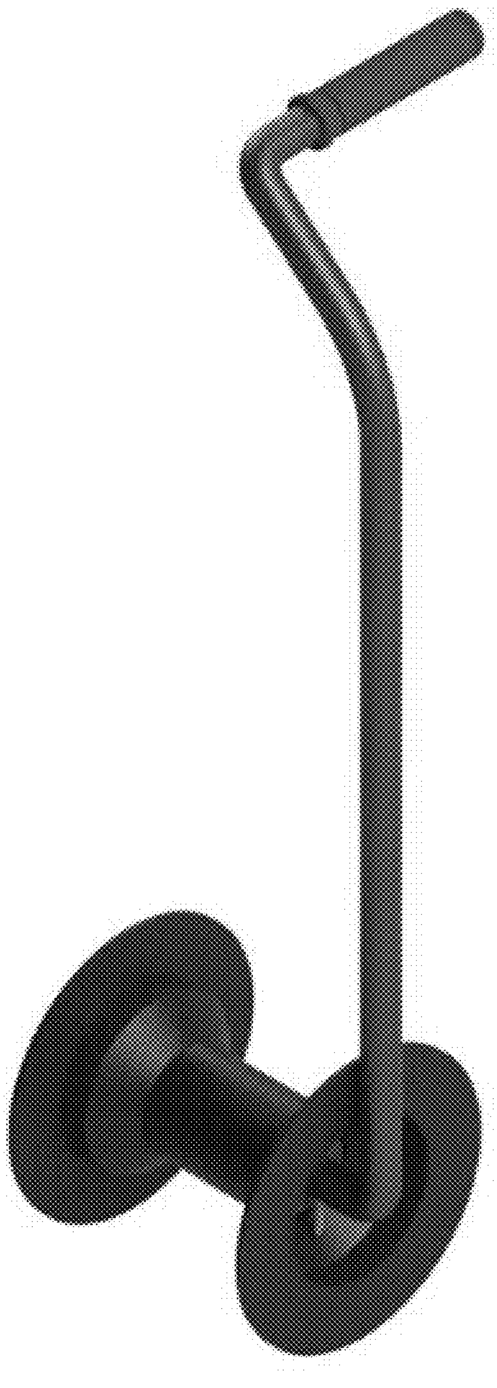
FIG. 12 (Prior Art)

FIG. 12 is an image of the prior art hose roller.

SUMMARY OF THE INVENTION

The present invention encompasses a hand-held hose roller device designed to assist an individual in removing residual fluid (such as gasoline or diesel fuel or any other liquid) from a flexible, large diameter hose (generally 3-4 inches in diameter), while significantly reducing the probability of injury.

The tool of the invention provides the user with a simple and effective way to, walk out the hose, greatly reduces the effort of this task and reduces the probability of spillage of hazardous liquids. It rolls easily under the hose as well as hose couplings. The user is able to walk upright along the hose length while holding the tool. This tool is designed to lift the hose from the ground at any point along its length. The user does not need to manually lift the hose onto or off the tool. Physically it is easier to lift the hose closer to the storage tank and empty the fluid. Then work your way to the delivery vehicle. Currently you start at the delivery vehicle and work toward the storage tank. This operation requires lifting a long hose with fluid and working toward the storage tank.

DETAILED DESCRIPTION OF THE INVENTION

The invention encompasses a hand-held hose roller device designed to address the very high rate of injury for liquid delivery truck drivers, by assisting an individual to remove residual fuel from a flexible, large diameter hose while reducing the probability of injury.

Liquid transport truck drivers have the highest rates of back injuries of any professional occupation. One in five workplace injuries in the U.S. involves a truck driver.

Hose handling, especially draining of residual liquid from the hose, plays a major role in accounting for this very high injury rate. There is a huge need for a simple and effective device to facilitate hose handling.

The present invention encompasses a hand-held hose roller device designed to assist an individual to drain residual fluid (such as gasoline or diesel fuel or any other liquid) from a flexible, large diameter fuel hose (generally 4 inches in diameter).

The device is made of a metal or alloy such as an aluminum or magnesium alloy, or may be made of a plastic material, or fiberglass or other material which should in any case be resistant to solvents such as gasoline.

The device has a central hub (1) from which a number of elements extend, and/or to which a number of other elements are attached. The device comprises several parts fitted together including a frame with a handlebar grip (13) and a bi-concave roller (4)* adapted to receive and partially support a large-diameter hose, so that in use, a hose passes over the roller, partially cradled by the roller.

*Because this element is so important to define geometrically, we shall define it here as as being a "concave cylinder". This may alternatively be described as a "waisted cylinder", but the technical term is a concave (or hyperboloid) cylinder. The surface may be mathematically described as approximating to a "hyperboloid of one sheet (precise geometric surface)". However the best way to define the hose roller is by the drawings and the text description is not meant to limit the description.

The handlebar grip (13) is positioned such that it is located vertically above the center of the roller, within a plane that passes through the center of the roller in the plane of rotation. This means that when the device is picked up using the handlebar grip (13), the center of gravity passes directly down from the handlebar grip to the roller, so that the roller is positioned directly below the handlebar grip.

The handlebar grip is usually of a knurled metal and specifically does not have a plastic or rubber or polymer coating, which is prone to deterioration when in contact with solvents.

The roller (4) may be described as an hourglass-shaped roller or pulley with circular flanges, a narrowed waist, with optional reinforced radial ribs on the side face, and an axial bore intended to house one or more bearings and/or a shaft. The roller is wider at both ends and narrower in the middle. The side faces (at the wide ends) are generally circular and disk-shaped, but the centre portion necks inward, giving it a concave waist. The outer surface (the curved part) is approximately smooth and continuous, without sharp transitions. A hub or axle hole is present at the centre, for mounting a shaft upon ball bearings. Optional radial ribs or spoke-like reinforcements extend from the centre outward on the end face for reinforced strength.

The frame is configured to be open-sided, to allow positioning of the hose into the frame. The frame comprises two bent or curved handlebars (9) extending from the hub and leading to and supporting a handlebar grip (13) positioned approximately perpendicular (at right-angles) to the handlebars, and shaped and adapted to allow easy gripping by a human hand.

The handlebar grip may be knurled (or otherwise shaped or coated) to provide an improved grip, especially since the device is adapted and intended to be used around slippery fluids and lubricants such as diesel and gasoline.

Each handlebar (9) is generally made from a tubular metal (or plastic) rod, terminating at a handlebar knuckle (12) and fastened thereto by a handlebar bolt (8) and a handlebar nut (7). The handlebar knuckle (12) further receives and retains a knurled handlebar grip (13), mounted between the upper terminal ends of the two handlebars, positioned approximately at right-angles to the handle bars, so that when the device is standing on the ground on the bumper stand (2), the handlebar grip is approximately perpendicular to the plane of the ground. The handlebar grip is secured into the handlebar knuckle by the same bolts as previously mentioned, or by different bolts. Alternatively, the any bolts mentioned may be replaced by rivets or welds or other secure fastening devices.

Very importantly for the invention, the two handle bars are bent (inflected) such that the handlebar grip, in use, is positioned directly above the roller within a plane that passes through the centre (narrow waist) of the roller in the plane of rotation. The inflection occurs approximately in the middle of the handlebars' length and is approximately between 40° and 50°, generally about 45°, but may be between 35° and 55°. The shape of the inflection is not important and the handlebars may be curved or inflected in various designs to achieve the same end.

Also very importantly, the "first end face" (18), which is also called the "outer face" has a larger diameter than the "second end face" (19) which is also called the "inner face". In a typical example the "first end face" (18) had a diameter of 6" and the "second end face" (19) has a diameter of 4.5".

When held in one hand by the handlebar grip, the device is constructed and weighted such that the centre of gravity passes directly down from the handlebar grip to the roller, so that the roller is positioned directly below the handlebar grip. I.e., if you hung a plumb line from the handlebar grip and lifted the device with one hand, the line would pass through the centre of the roller beneath it.

When not in use, the device may be placed on the ground and stands upright, resting on the bumper/stand (2) affixed to the hub (1) with retaining screws (3). The device in a resting position is positioned upright so that the operator does not have to bend down to ground level to grip it. The device will rest on the bumper/stand with two points touching the ground, and with the third point of contact being the roller itself (4).

The bumper/stand may be made of a shock-absorbing material which may be flexible and aids in supporting the device in an upright position when placed on the ground.

The shape and balance of the device facilitates lifting the hose at any point along its length, including over coupled sections. The knurled handlebar grip (13) is positioned with respect to the foot to allow easy use while standing upright. The device is ergonomically designed to reduce the physical burden associated with the manual 'walk out' process.

The device includes a rolling assembly with dual (at least two) ball-bearing Rollers (5) for smooth operation, that is attached to a Frame (1).

The frame allows the device to stand upright on its own when placed on the ground.

EMBODIMENTS OF THE INVENTION

In various exemplary embodiments, the invention is as follows:

A handheld roller device for removing residual fluid from a flexible hose, comprising:

- a frame (1) having a top side (20) and a bottom side (21) and a front side (22) and a back side (23), and connected to and projecting from said top side of said frame, a pair of integrated handlebars (9) terminating in a handlebar grip (13) and configured to be grasped by a user;
- wherein the handlebars project from the top side of the frame and are bent approximately in the middle of their length such that the handlebar grip is horizontally displaced from the frame in the direction of the front side of the frame;
- and wherein the frame further includes a bore in the form of a tubular void (25) that accepts and supports a roller axle (6) over which is mounted a hose roller (4) supported by two roller bearings (5 and 17), adapted to fit into the hose roller, wherein the hose roller is adapted to rotate freely about the roller axle, and is configured to support a hose resting thereon;
- wherein the roller (4) has a first end face (18), a second end face (19), and a surface connecting the first and second end faces, the surface having a medial concave region (14) between the end regions, the medial concave region configured to receive the hose; wherein the handle bar grip may be gripped by a user such that, in use, it is positioned vertically above the medial concave region (14) of the hose roller; and further comprising a shock-absorbing foot attached to the frame, shaped to allow the handheld roller device to stand upright when not in use.

Importantly, the device includes at least two roller bearings housed between the hose roller and the roller axle, for smooth rotational movement, and the bearings are completely sealed so as to prevent (so as not to allow) ingress of any dust or dirt or liquid or particulate matter, and wherein the roller bearings do not require lubrication. The use of sleeves or bushings is rejected in this invention as they require lubrication, which often is not done, and it causes multiple problems with ingress of dust or dirt or liquid or particulate matter, leading to seizing up of the axle, which leads to injuries.

Importantly, in a preferred embodiment the hose roller is constructed so that wherein the handle and frame are arranged so that when the device hangs from a user's extended arm, the hose is supported at a height sufficient to allow gravity drainage of fluid.

Preferably when a user used the hose roller device, the user maintains an erect posture throughout the draining operation. This is very important for avoiding injuries and is directly facilitated by the design of the roller and the position of the handle.

Narrower, dependent embodiments include the following. The device wherein the roller includes sealed ball bearings housed in a hub for smooth rotational movement. The device wherein the handle comprises a knurled metal surface for improved grip and is ergonomically shaped and connected to the handlebars using handle fasteners; and the device wherein the spacing of the hose roller is adapted to support a standard 4-inch diameter fuel delivery hose having metal couplings.

Further embodiments are described as follows. The device above wherein the roller is rotatably mounted about a central axis, the roller having a first end face, a second end face, and an outer surface extending between the first and second end faces, the outer surface comprising a first outwardly convex end region adjacent the first end face, a second outwardly convex end region adjacent the second end face, and a medial concave region between the end regions, the medial concave region configured to receive and cradle the hose.

In some embodiments the roller may have a plurality of radial ribs extending from a central bore at least one of the end faces, the central bore receiving a rotational shaft.

In some embodiments the device may have a bearing assembly mounted within the support structure and configured to support rotation of the roller about the shaft and a flexible base attached to the frame and configured to permit the device to stand upright on a surface and to absorb vertical impact forces.

An alternative description of the invention is as follows. A hand-held device for draining residual fluid from a flexible hose, comprising: (1) a frame defining an open side configured to receive the flexible hose therethrough; (2) a handle fixedly attached to the frame and configured to be grasped by a user; (3) a support structure attached to the frame, the support structure comprising: (a) a roller rotatably mounted about a central axis; (b) the roller having a first end face, a second end face, and an outer surface extending between the first and second end faces; (c) the outer surface comprising a first outwardly convex end region adjacent the first end face, a second outwardly convex end region adjacent the second end face, and a medial concave region between the end regions, the medial concave region configured to cradle the hose; (d) a plurality of radial ribs extending from a central bore positioned at at least one of the end faces, the central bore receiving a rotational shaft; (4) a bearing assembly mounted within the support structure and configured to support rotation of the roller about the shaft; (5) a flexible base attached to the frame and configured to permit the device to stand upright on a surface and to absorb vertical impact forces.

Alternative embodiments include a device wherein the trough ("cup") of the roller is sized to centre the hose relative to the frame.

In another embodiment the flexible base is further configured to prevent tipping of the device when standing upright on uneven surfaces.

In another embodiment the frame is constructed from a fuel-resistant material.

In another embodiment the flexible base is detachable and replaceable.

In another embodiment the roller assembly includes dual ball bearing races positioned at opposite sides of the support structure.

In another embodiment the flexible base provides cushioning sufficient to prevent mechanical damage to the roller assembly during drops from a height of up to three feet.

In another embodiment the flexible base comprises at least one vertically compliant member to absorb vertical shock forces.

METHODS OF USE

The invention also includes methods of using the hose roller of the invention. For example: a method of draining residual fluid from a flexible hose, comprising:

(a) placing the flexible hose into an open side of a device according to claim 1;
(b) supporting the hose on the roller assembly;
(c) grasping the handle of the device;
(d) walking along the length of the hose while allowing the device to roll under the hose, thereby draining residual fluid toward a distal end of the hose.

The method may further include rolling the device over one or more hose couplings without manual lifting; and positioning the device at any selected point along the hose between the delivery vehicle and the storage tank.

Importantly the method provides for standing the device upright when not in use to prevent tripping hazards.

Preferably when a user used the hose roller device, the user maintains an erect posture throughout the draining operation. This is very important for avoiding injuries and is directly facilitated by the design of the roller and the position of the handle. The roller maintains the fuel hose central on the roller, and in use, the user walks in erect posture from the truck along the fuel hose with the lift hanging from the user's downwardly extending arm. As the hose leads to the ground and before the hose reaches the ground, the hose moves into the roller trough ("roller cup") engaging the hose at a hose engagement level several inches above the ground. As the user continues to walk slowly along the hose, the user lifts the fuel hose in successive portions along the fuel hose progressively urging fuel in the hose to move forward of the lift by gravity while hose portions rearward of the lift, that is, toward the truck, fall to the ground empty of fuel.

An Exemplary Embodiment Related to the Drawing

The invention shown in FIG. 1 comprises a device used to roll under and lift up and support a fluid delivery hose, aiding in the removal of residual fluids. The main components include:

Frame (hub) (1): A rigid, durable structure made for example from metal or plastic that supports the roller system and forms the structural scaffolding of the device. It houses the axle openings and attachment points for other components as well as the handle bar grip.

Flexible foot: Attached by bolts to the bottom of the frame; the Foot acts as a shock absorber and stabilizing base. It allows the tool to stably stand upright unaided, and also absorbs impact when in use.

Hose roller (4): adapted to support a hose and is mounted on a roller axle (6) optionally fitted with radial ball bearings (in ball races) and fitting through a central hole in the hose roller (4), through an axle nut (10) and secured at its terminal end by an axle nut cap (15). The axle supports rotation of the hose roller. If used, a ball race is one of the two grooved tracks in which the balls of a ball bearing rotate. The invention includes an inner race and an outer race. The balls roll between the two races. The races are usually made of hardened steel or other durable material.

The rose roller is an asymmetric concave cylinder, with one round end having a larger diameter than the other (the 'first end face' and the 'second end face'). In a preferred embodiment the dimensions of the roller is:

Outer (First end face)=6 inches diameter.
Inner (Second end face)=4.5 inches diameter,
Width from one face to the other 4.5 inches.

2. The device of claim 1 wherein the roller (4) is asymmetrical in a plane orthogonal to its axis, passing through the midpoint of the concave dip, wherein the edges of the first end face and the second end face of the roller are defined as being at the circumference of the faces, wherein the first end face (18) has a larger diameter than the second end face (19).

3. The device of claim 2 wherein the ratio of the diameter of the first end face to the diameter of the second end face is between 1:0.65 and 1:0.85.

4. The device of claim 2 wherein first end face had a diameter of between 5.5 inches and 6.5 inches, and the second end face has a diameter of between 4.25 inches and 5.25 inches.

5. The device of claim 2, wherein in use, with a coupled hose positioned on the roller, where the cams are positioned 180 degrees apart on the hose, with the coupled hose coupler placed on the top of the roller, there is a total of at least 50 degrees of rotational freedom between the cams and the edges of the roller.

Roller bearings (5): Dual large-profile roller bearings (5) are set on either side of the hose roller and may include sealed ball bearing units to ensure smooth rolling.

Handle Bars (9): are integral to the frame (1) and are positioned within the Frame's upper region to support the Knurled Handle Bar Grip.

Knurled Handle Bar Grip (13): A rigid extension from the frame (1) is the user's point of contact. It is ergonomically angled, terminates into a handle bar knuckle (12) and is secured with threaded ends by nut and bolt fasteners (7 and 8) for structural integrity.

When the tool is placed under a hose, the hose roller (4) lifts the hose from the ground, allowing fluid to drain as the user walks the device forward. Because of the open space between the Rollers and the Foot (2), the device can roll over coupled hose segments without interruption.

The tool's geometry ensures minimal effort during use. The device of the present invention uses a dual ball bearings, and not bushings, which creates a smooth gliding operation as you walk the device along the length of the hose.

In this application it should be noted that the word "bushes" refers to bushings, which is a type of plain bearing designed to reduce friction and wear between a rotating axle (or shaft) and a stationary housing. They enable smoothish (but not smooth enough) rotation and movement, protect components from damage, and contribute to overall system efficiency. Bushings are typically cylindrical sleeves, often made of a single material, and are inserted into a housing to provide a bearing surface for the axle. Unlike rolling-element bearings (like ball bearings, which use balls or rollers to reduce friction), bushings operate on the principle of sliding motion between surfaces. Lubrication (either external or self-lubricating within the bushing material) helps facilitate this sliding and minimize friction. Again, the present invention employs a dual bearing system, with roller bearings (ball bearings) mounted on the axle, at either side of the hose roller.

The position of the handle (13) keeps the user in a natural walking posture, and the shock-absorbing foot prevents impact wear. The structure is lightweight yet robust, allowing repeated use in demanding field conditions.

Further Disclosures Regarding the Roller and Offset Between Roller and Hub/Handlebars The inventor of this device drives a fuel delivery truck and is intimately aware of the risks and needs relevant to this sort of work. In the company the inventor works for, a few drivers are in their 80's and this device is designed to address the frequent injuries suffered by all fuel delivery drivers, the device greatly reduces the strain on the body of the driver when "walking out" the fuel delivery hose to drain it of excess fuel.

Unlike the old roller, the present hose roller easily moves beneath the hose couplings, which are typically used when linking multiple hoses together. The reason the older device does not easily transition over couplings is simply because of the old roller design, which is designed to accommodate the hose diameter but not the couplings, which are metal and have a larger diameter than the hose. The handlebar (a single handlebar) of the old hose roller (FIG. 6) is positioned immediately vertically to the side of the roller, and it gets caught on the couplings as the roller moves beneath the hose. This causes difficulties as the couplings are forced over the hose roller, and leads to injury.

Figure 2:
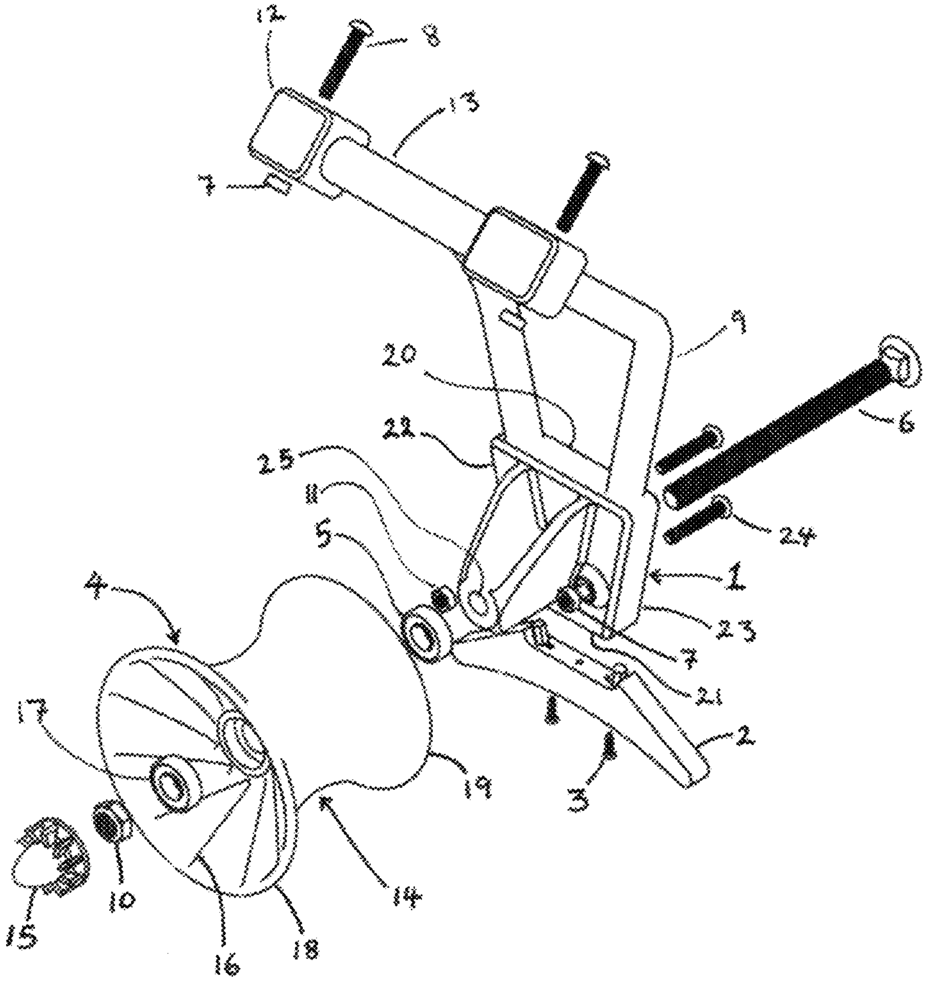
FIG. 2 is an annotated schematic diagram of the hose roller with parts labelled as follows.

In the new invention, there is a significant offset distance (about 2-6 inches) between the handlebars and the roller, and between the handlebars and the hose while in use, (see FIG. 2), and this allows lots of room (about 1-5 inches clearance between the coupling and the handlebars, so, in use, the coupling passes well clear of the handlebars and does not get caught or impede the easy movement of the hose roller under the hose and couplings.

In the old device, the small straight (not inflected) cylinder (like a toilet roll shape) supports the hose which passes very close to the handlebar of the device, and when the driver is walking out the hose, and a coupling comes along, it hits and catches on the handlebar, halting movement. Because of how the roller is designed on the new device, it allows you to easily lift the hose at any point along the path, starting at either end. Even though the tool makes it easier to do your job, effort is still required and the heavier the hose is (more product within) the more work is required. The inventor notes that in the company he works for, many drivers are in their 80's so any chance to make it easier is always beneficial as the strain on your body is reduced greatly.

The offset distance between the roller (or, in use, the hose) and the handlebars is obviously very important as it allows easy movement of a coupled hose along a roller. In different embodiments distance between the hose and the handlebars (see FIG. 2), may be, for example, about 3-5 inches. In other embodiments it is 1-2 inches, or 2-3 inches or 2-4 inches or 2-5 inches. This distance depends to some degree on the orientation of the hose. But assuming the house roller is positioned standing upright, the distance between the hose and the handlebars is between 1 inch and 3 inches.

The offset distance between the roller (or, in use, the hose) and the handlebars helps the larger coupling fit between the handlebars and roller. Typically, the hose is 4 inches in diameter and the coupling is a 6.5 inches in diameter. Also note that on the old roller, in use, the center of the weight is offset (handle position isn't over the roller), whereas in the new invention, it is.

The old roller has a smaller diameter wheel compared to the new invention, and the inventor has found that not only does a larger wheel help the movement of couplings over the roller, but it also helps in scooping the hose off the ground. This is due to the geometry of the roller in relation to the hub and the handlebars.

The concave roller is asymmetrical in a plane orthogonal to its axis, passing through the midpoint of the concave dip. One circular end has a larger diameter than the other circular end. Refer to FIGS. 1 and 4. The "first end face" or "outer face" (18) has a larger diameter than the "second end face" or "inner face" (19). In a typical example the "first end face" (18) had a diameter of 6" and the "second end face" (19) has a diameter of 4.5". A typical ratio of diameters is 1:0.75 (outer:inner). In other embodiments the ratio may be 1:0.75 (outer:inner). +/−10% or +/−15%, or between 1:0.75, 1:0.8, 1:0.85, 1:0.7, or 1:0.65.

The asymmetry of the roller is important. If it were equal, you would have 20 degrees of free rotation on each side between the cams and the roller (40 degrees overall). This offset provides an extra 10 degrees of rotation, providing a total of 50 degrees of freedom of rotation (in certain embodiments 45 to 55 degrees of freedom of rotation) in total between the cams and the roller. 50 degrees of freedom of rotation is the preferred embodiment, +/−5%, as it provides a good fit with the hose but allows easy pick-up from the ground. In alternative embodiments the device may provide, at least 45 degrees, 50 degrees, 55 degrees, 60 degrees, or between 45-65 degrees, 47-53 degrees or 45-60 degrees of rotation between the cams and the roller. The coupler mechanism has cams that project out from the hose and that are positioned exactly opposite each other on the hose—i.e. 180 degrees apart.

The cam is a part of a locking hose coupler mechanism; a "cam-lock". A locking coupler locks two hoses together. One of the hoses has a gasket end, and the other has a receiving end. The gasket fits into the receiving end. These lock together using a cam-and-grove mechanism well known in the art. The cam part is a lobed and shaped piece of metal, shaped to fit lockably into a receiving groove. The cam may be levered and may also include a cam arm that levers projects out for fitting and can be levered down into a closed position. It can take several forms, just so long as it is a projection that fits securely into a grove to lock the two parts together. When pushed/moved/rotated it locks into the groove of the hose fitting. In the present invention there are two cams, oppositely disposed on the coupling, that project out from the hose coupling (FIGS. 5, 6 and 7). These cams have a diameter wider than the hose. These projecting cams will not fit directly into the receiving cup of the hose roller. This is important in the present invention because the hose roller is designed to be asymmetrical in a plane orthogonal to its axis, passing through the midpoint of the concave dip, wherein the first end face (18)—the outer face—has a larger diameter than the second end face (19)—the inner face. The "first end face" or "outer face" (18) has a larger diameter than the "second end face" or "inner face" (19). In a typical example the "first end face" (18) had a diameter of 6" and the "second end face" (19) has a diameter of 4.5". A typical ratio of diameters is 1:0.75 (outer:inner). In other embodiments the ratio may be 1:0.75 (outer:inner). +/−10% or +/−15%, or between 1:0.75, 1:0.8, 1:0.85, 1:0.7, or 1:0.65. The edge-to-edge asymmetry of the roller is important. If it were equal, there would be a total of 40 degrees of freedom of rotation between the projecting cams and the edge of the roller (20 degrees on each side—but of course this varies with the positioning of the hose in the receiving cup). The present roller is asymmetrical such that one circular end of the roller, the first end face (18), has a larger diameter than the other circular end, the second end face (19). This offset provides an extra 10 degrees of rotation, providing a total of 50 degrees of freedom of rotation (in certain embodiments 45 to 55 degrees of freedom of rotation) in total between the cams and the roller. 50 degrees of freedom of rotation is the preferred embodiment, +/−5%, as it provides a good fit with the hose but allows easy pick-up from the ground. When you have to link up hoses, getting them perfectly parallel can be difficult, especially if you're moving from one location/tank/compartment to another, so the smaller diameter side of the roller helps provide more rotation, making it easier to align and pick up the hose and fit it into the roller. However, the receiving cup can't be too small in diameter, because otherwise the cams would then hit the hub. The larger diameter of the first end face (18) also helps with stability.

Often when you have to link up hoses, getting them perfectly parallel can be difficult, especially if you're moving from one location to the other, so the smaller arc of the roller helps provide more freedom of rotation for the hose, making is easier to move the roller beneath the hose. However, arc of the roller can't be too small in diameter, because otherwise the cams would then hit the hub. The larger diameter of the first end face (18) also helps with stability when resting because it provides a third point of contact to the ground.

Objects and Advantages

Existing tools designed to assist with this task are cumbersome, unstable, prone to jamming, and ineffective, especially when traversing hose couplings. These present hose roller tools do not stand up vertically on their own, but when released, fall to the ground.

They employ bushings rather than bearings and are made with materials that fail under harsh weather conditions or become jammed in use or slippery when contaminated by fuel.

The handle of the old tool is rubber which breaks down when exposed to fuel and oil. The present hose roller uses a knurled metal handle which provides excellent grip and won't break down.

The old hose roller uses bushings which is a non-moving self-lubricating metal part that reduces friction and though it is great for long lasting performance due to its own nature (no moving parts), but it also doesn't provide free movement or easy movement and it often sticks or 'hangs' (stops moving) causing jerky motion. Bearings are relatively inexpensive and easy to change out should they go bad. The present invention used dual bearings, one at the beginning and end of the roller offering great stability, movement and longer life due to the load essentially being halved.

The connecting arm (from roller to handle) on the old device is a single piece of metal (basically a large C), whereas the present invention has two inflected handlebars that start at the hub and connect a handle across the top in a roughly triangular/parallelogram shape (see the drawings). This not only decreases the strength needed to pull the hose, by spreading the load to two points, but it also offers more control when using the tool. A single arm will twist, it will provide a high-stress twisting motion in use, and offer little leverage or torsional control, transferring all of the twisting motion to the user's wrist and arm, requiring a lot of force to counteract, whereas the present invention provides leverage through the two handlebars and nearly eliminates this high-stress twisting motion.

The present invention has a thermoplastic polyurethane (TPU) base which doubles as a stand, so the tool stays upright between hose lifts but also protects the hub from impacts should it be dropped. TPU is extremely resistant to both diesel and gas providing extra protection over the course of the tools life.

Further objects and advantages of the invention over the prior art include: (i) The present invention uses a dual ball bearing system which creates a smooth gliding operation as you walk it along the length of the hose. Specifically the present invention does NOT use bushes, but bearings. (ii) It stands upright on its own using the flexible foot, which doubles shock absorber to prevent impact damage. (iii) It easily rolls over coupled fittings. (iv) It can lift the hose at any point with ease from the ground. This is particularly useful when you have to link up (couple hoses together) to reach the delivery location, (v) The present invention provides the user the advantage is being able to empty fuel from the tank to the delivery vehicle, at any point, and lightens the load, thus making it not so physically strenuous. (vi) It also allows the user to be easily placed right under the coupled hoses, greatly reduces the work required to do so. (vii) The handle grip is knurled metal which retains grip even when wet.

General Disclosures

This specification incorporates by reference all documents referred to herein and all documents filed concurrently with this specification or filed previously in connection with this application, including but not limited to such documents which are open to public inspection with this specification. All numerical quantities mentioned herein include quantities that may be plus or minus 20% of the stated amount in every case, including where percentages are mentioned. As used in this specification, the singular forms "a, an", and "the" include plural reference unless the context clearly dictates otherwise. Thus, for example, a reference to "a part" includes a plurality of such parts, and so forth. The term "comprises" and grammatical equivalents thereof are used in this specification to mean that, in addition to the features specifically identified, other features are optionally present. For example, a composition "comprising" (or "which comprises") ingredients A, B and C can contain only ingredients A, B and C, or can contain not only ingredients A, B and C but also one or more other ingredients. The term "consisting essentially of" and grammatical equivalents thereof is used herein to mean that, in addition to the features specifically identified, other features may be present which do not materially alter the claimed invention. The term "at least" followed by a number is used herein to denote the start of a range beginning with that number (which may be a range having an upper limit or no upper limit, depending on the variable being defined). For example, "at least 1" means 1 or more than 1, and "at least 80%" means 80% or more than 80%. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. Where reference is made in this specification to a method comprising two or more defined steps, the defined steps can be carried out in any order or simultaneously (except where the context excludes that possibility).

Definitions

"Outwardly convex" when referring to the hose roller refers to a concave cylinder that it wider at each end and narrower in the middle, with a smooth scooped waist shape.

"Medial concave region" when referring to the hose roller means refers to the narrowed waist in the center. It may also be called the "receiving cup" of the hose roller.

The "receiving cup" of the hose roller comprises the "Medial concave region" of the hose roller and is designed to reasonably accurately receive a round fuel delivery hose in the receiving cup.

"Radial reinforcement ribs" when referring to the hose roller means the ribs that radiate out from the tubular void of the hose roller to the outside edge of the hose roller. They are optional.

"First end face" (18)=the outer face, distal to the hub.

"Second end face" (19)=the inner face, closer to the hub.

"Central bore" when referring to the hose roller means the hole running through the axis.

"Inflected" when referring to the handle bars means that the two handle bars are bent such that, in use, they are positioned directly above the roller within a plane that passes through the centre (narrow waist) of the roller in the plane of rotation. When held in one hand by the handlebar grip, the device is constructed and weighted such that the centre of gravity runs from the hand to the waist of the hose roller, meaning the user can hold and pull the device parallel/collinear to the force required to move the hose without any torsion or vector force needing to be applied. This avoids injury.

The word "bushes" refers to bushings, which are cylindrical sleeves, inserted into a housing to provide a bearing surface for the axle. Unlike rolling-element bearings (like ball bearings, which use balls or rollers to reduce friction), bushings operate on the principle of sliding motion between surfaces and often get stuck, and require proper lubrication to continue working.

"Hose coupler" for a fuel-tanker delivery hose is a mechanical connector assembly configured to join a flexible delivery hose to another hose, pipe, or fixed fitting in order to provide a sealed and secure fluid path for the transfer of liquid fuel. Note that the coupler mechanism has cams that project out from the hose and that are positioned exactly opposite each other on the hose—i.e. 180 degrees apart.

"Cam" is a term that refers to a part of a locking hose coupler mechanism; a "cam-lock". A locking coupler locks two hoses together. One of the hoses has a gasket end, and the other has a receiving end. The gasket fits into the receiving end. These lock together using a cam-and-grove mechanism well known in the art.

"Degrees of freedom of rotation" when referring to the present invention means the total number of degrees that you can rotate the hose, with the projecting cams, sitting in the receiving cup of the hose roller from one side to the other where the cans touch and are arrested by the edge of the roller.

"Top of the roller" or "Apex of the roller" in this context refers to the portion of the roller that is at the top of the roller when the device is standing up on the base. In use, with a coupled hose positioned in the roller, with a hose coupler positioned at the top of the roller, there is a total of at least 50 degrees of rotational freedom between the cams and the roller.

The invention claimed is:

1. A handheld roller device for removing residual fluid from a coupled flexible fuel hose, comprising:

a frame (1) having a top side (20) and a bottom side (21) and a front side (22) and a back side (23), and connected to and projecting from said top side of said frame, a pair of integrated handlebars (9) terminating in a handlebar grip (13) and configured to be grasped by a user; wherein the pair of integrated handlebars project from the top side of the frame and are both curved or inflected in a same direction such that the handlebar grip is horizontally displaced from the frame in a direction towards and over the front side of the frame;

and wherein the frame further includes a bore in the form of a tubular void (25) that accepts and supports a roller axle (6) upon which is mounted a rotatable hose roller (4) supported by two roller bearings (5 and 17), adapted to fit into the hose roller, wherein the rotatable hose roller is adapted to rotate freely about the roller axle, and is configured to support the coupled flexible fuel hose resting thereon;

wherein the roller (4) is cylindrical but concave, and has a first end face (18), a second end face (19), and a surface connecting the first and second end faces, the surface having a medial concave region (14) between the first and second end faces, the medial concave region configured to receive the coupled flexible fuel hose;

wherein a diameter of the first end face is greater than a diameter of the second end face such that, when a cam-lock coupler having a pair of cams positioned approximately 180 degrees apart is disposed adjacent the rotatable hose roller, the cam-lock coupler is rotatable relative to the rotatable hose roller through at least 50 degrees without interference between the pair of cams and the rotatable hose roller; and wherein each integrated handlebar is curved to displace the handlebar grip (13) toward a centerline of the rotatable hose roller such that a pulling force applied by the user through the handlebar grip (13) is directed substantially toward the roller axle; and further comprising a shock-absorbing foot (2) attached to the frame, shaped to allow the handheld roller device to stand upright when not in use, wherein the two roller bearings, and not bushings are used to facilitate a rotation of the axle.

2. The device of claim 1, wherein the roller (4) is asymmetrical in a plane orthogonal to a roller axis, passing through a midpoint of the medial concave region (14) of the roller (4), wherein the first end face (18) has a larger diameter than the second end face (19).

3. The device of claim 2, wherein a ratio of the diameter of the first end face to the diameter of the second end face is between 1:0.65 and 1:0.85.

4. The device of claim 2, wherein the first end face has a diameter of between 5.5 inches and 6.5 inches, and the second end face has a diameter of between 4.25 inches and 5.25 inches.

5. The device of claim 2, wherein the handlebar grip does not have a plastic or rubber or polymer coating.

6. The device of claim 5, wherein in use, with the coupled flexible fuel hose positioned in the roller, there is a total of at least 52.5 degrees of rotational freedom between the pair of cams and the edges of the roller, wherein the cam-lock coupler is rotatable relative to the rotatable hose roller through at least 52.5 degrees without interference between the pair of cams and the rotatable hose roller.

7. The device of claim 1, wherein the roller has the first end face with a diameter of 6 inches+/−5%, and the second end face with a diameter of 4 inches+/−5%, and a width of the roller from the first end face to the second end face is 4.5 inches+/−15%, and in use, with the coupled flexible fuel hose positioned in the roller, there is a total of at least 50 degrees of rotational freedom between the pair of cams and the first end face (18), the second end face (9) of the roller.

8. The device of claim 1, wherein the roller includes the two roller bearings housed between the hose roller and the roller axle, for smooth rotational movement, and the bearings are completely sealed so as not to allow ingress of dust or dirt and wherein the roller bearings do not require lubrication.

9. The device of claim 1, wherein the handlebars are inflected such that the handlebar grip, in use, is positioned directly above the roller within a plane that passes through a center of the roller in a plane of rotation, such that, when held in one hand by the handlebar grip, the device is constructed and weighted such that a centre of gravity passes directly down from the handlebar grip to the roller, so that the roller is positioned directly below the handlebar grip.

10. The device of claim 1, wherein the handlebar grip comprises a non-slip metal surface for improved grip and is ergonomically shaped and connected to the handlebars using handle fasteners and bolts, and wherein the handlebar grip may be gripped by the user such that, in use, the handlebar grip is positioned vertically above the medial concave region of the hose roller.

11. The device of claim 1, wherein a size and shape of the hose roller is adapted to support a standard 4-inch diameter fuel delivery hose having metal couplings.

12. The device of claim 6, wherein a size and shape of the medial concave region of the hose roller is at least a same diameter of a coupling on the coupled flexible fuel hose, and is larger than a diameter of the hose.

13. The device of claim 1, wherein the frame includes a channel or mount to align the hose with the hose roller.

14. The device of claim 1, wherein the frame, handlebar grip and hose roller is composed of fuel-resistant material.

15. A method of walking-out a coupled flexible fuel hose, the method comprising:

(i) providing a handheld roller device for removing residual fluid from the coupled flexible fuel hose, comprising: a frame (1) having a top side (20) and a bottom side (21) and a front side (22) and a back side (23), and connected to and projecting from said top side of said frame, a pair of integrated handlebars (9) terminating in a handlebar grip (13) and configured to be grasped by a user; wherein the pair of integrated handlebars project from the top side of the frame and are both curved or inflected in a same direction such that the handlebar grip is horizontally displaced from the frame in a direction of the front side of the frame, over a rotatable hose roller;

and wherein the frame further includes a bore in the form of a tubular void (25) that accepts and supports a roller axle (6) upon which is mounted the rotatable hose roller (4) supported by two roller bearings (5 and 17), adapted to fit into the hose roller, wherein the hose roller is adapted to rotate freely about the roller axle, and is configured to support the coupled flexible fuel hose resting thereon;

wherein the roller (4) is cylindrical but concave, and has a first end face (18), a second end face (19), and a surface connecting the first and second end faces, the surface having a medial concave region (14) between the first end face and the second end face, the medial concave region configured to receive the hose;

and wherein the diameter of the first end face is larger than the second end face;

further comprising a shock-absorbing foot (2) attached to the frame, shaped to allow the handheld roller device to stand upright when not in use, wherein the roller bearings, and not bushings are used to facilitate the rotation of the axle;

wherein in use, with the coupled flexible fuel hose having a cam-lock coupler having a pair of cams positioned approximately 180 degrees apart is positioned in the roller, there is a total of 50 degrees+/−5% of rotational freedom between the cams and the roller (ii) placing the coupled flexible fuel hose upon the hose roller; and (iii) walking the device along the coupled flexible fuel hose's length to drain residual fluid.

16. The method of claim 15, wherein the device is used to drain a liquid from a delivery vehicle back to a storage tank.

* * * * *